O. A. WIRKKALA.
LOGGING SYSTEM.
APPLICATION FILED FEB. 4, 1918.
1,336,877.
Patented Apr. 13, 1920.
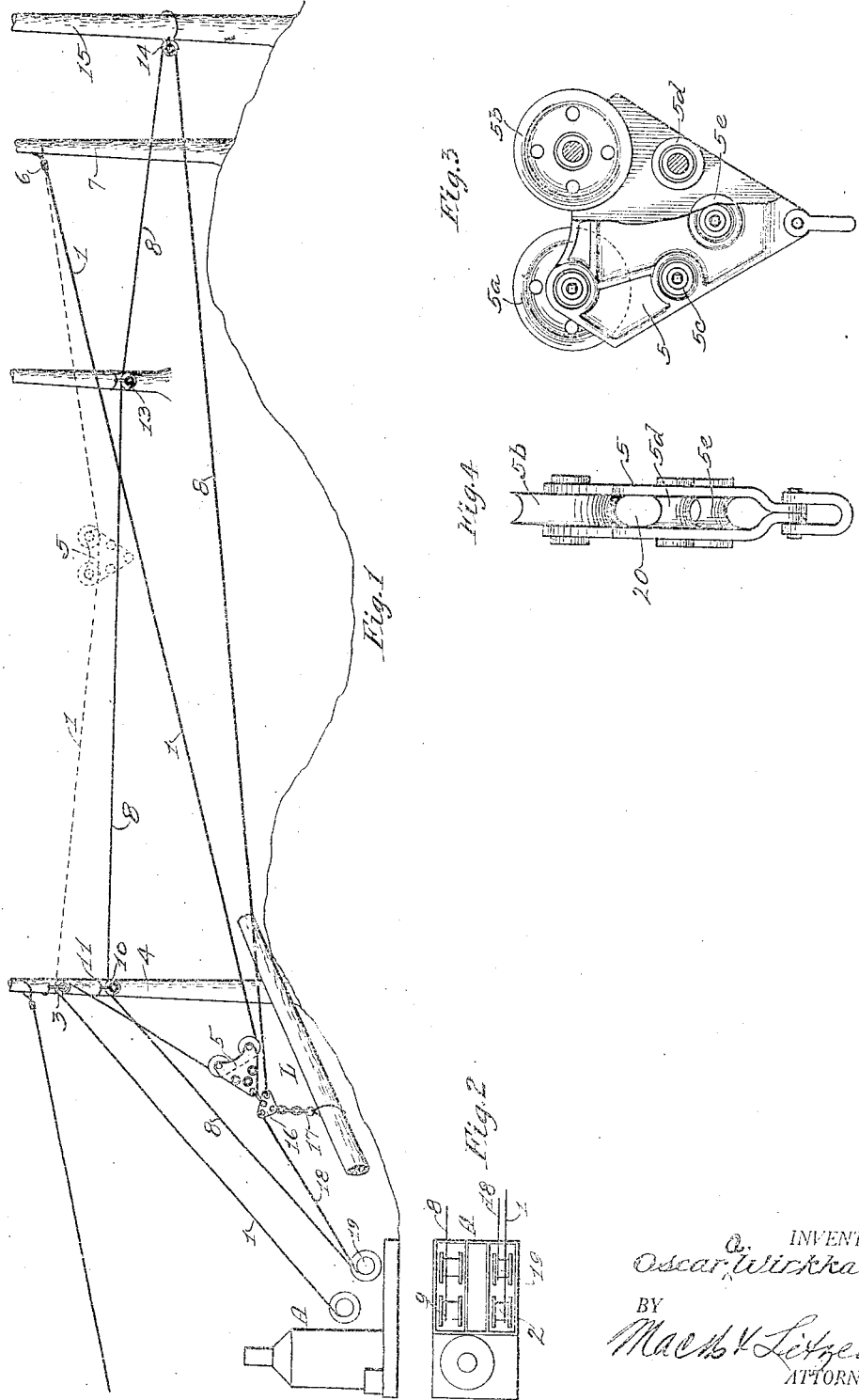
INVENTOR.
Oscar A. Wirkkala:
BY
Mack & Litzenberg
ATTORNEY.

UNITED STATES PATENT OFFICE.

OSCAR A. WIRKKALA, OF KENT, WASHINGTON.

LOGGING SYSTEM.

1,336,877.  Specification of Letters Patent.  Patented Apr. 13, 1920.

Application filed February 4, 1918. Serial No. 215,532.

*To all whom it may concern:*

Be it known that I, OSCAR A. WIRKKALA, a citizen of the United States, residing in the city of Kent, county of King, and State of Washington, have invented certain new and useful Improvements in Logging Systems, of which the following is a specification.

My invention relates to logging systems, such as referred to in my United States Patent No. 1,251,157, issued to me December 25, 1917, and it has among its salient objects, to provide a logging system by means of which logs within a comparatively large area can be quickly picked up and conveyed to a desired assembling location with little or no changing of the cables and cable connections used for gathering said logs; to provide in connection therewith a central controlling station, or power mechanism, capable of control by one man; to provide as a part thereof an improved carriage block for the sky line, with operating connections thereto from said power station for moving it in either direction on said sky line.

In order to fully illustrate and explain my invention, I have shown one embodiment thereof on the accompanying sheet of drawings which I will now describe.

Figure 1 is a general view showing my system in operation;

Fig. 2 is a top plan view of a four drum engine for handling the various cables of my system; and Figs. 3 and 4 are side and edge views, respectively, of my improved carrier block.

Referring now more in detail to the drawings, A represents my improved four drum engine, described and claimed in my patent above referred to, three drums of which are used in the present system, as now to be described. My system can be arranged in the woods, the different attachments of the lines being made to the trees, stumps, or other suitable anchoring means which may be within reach around the area from which the logs are to be gathered. In my system as here shown, 1 designates a sky-line, which extends from a drum 2, of the engine A, through a suitable pulley or sheave 3, secured to a tree 4, thence through the carrier block 5, and to a distant point, where it is secured, as at 6, on a tree 7. In the drawings, said sky-line is shown in a slackened condition, and drawn down and beyond the point of the first sheave 3 over which it passes, in order to deliver the log L nearer to the power station, or engine A.

A haul-back line 8, extends from drum 9, of said engine A, through a sheave 10, secured at 11, to a tree 4, and extended thence to and through a sheave 13, thence to another sheave 14, on tree 15, and thence to the carrier block mechanism, where it is attached to a member 16, carried by the block 5, and to which member is attached the chockers 17, which are secured to the log L.

A main line 18, runs from drum 19, of said engine A, to and is attached to the opposite, or near side of the member 16, as shown, and by means of which said member, together with the carrier block 5, sky-line 1, and log L, have all been pulled to the positions shown in full lines in Fig. 1 of the drawings.

My improved carrier block 5, as shown in Figs. 3 and 4, is of triangular form, with two sheaves $5^a$ and $5^b$ between its sides, at the upper edge thereof, and under which sheaves the sky-line passes, and two smaller sheaves, $5^c$ and $5^d$, between its sides, and below the sheaves $5^a$ and $5^b$, whereby there is formed a free passageway, as at 20, for said sky-line. A third small sheave, $5^e$, is also mounted between the sides of the block 5, and below and midway between the sheaves $5^c$ and $5^d$, as clearly shown, thus adapting my improved block to many different uses, and without any difficulty in adapting different cables thereto and therethrough, as may be required in an extensive logging system.

The operation of my invention as here illustrated, may be briefly described as follows:

Assuming that the log L has been released at the place it is shown on the drawings and it is desired to bring up another log from the opposite end of the area over which the system is stretched, the operator starts the engine to draw sky-line 1 to the position shown in dotted lines, that is, in substantially taut condition, with the carrier block shown in place thereon. He then operates drum 9, which operates the haul back-line 8, and this results in moving the carrier block 5 and the chockers 17 back to the extreme right-hand end of the area. He then again releases the sky-line so as to allow it to be pulled down, together with the carrier block 5, to the log which is to be picked up; the chocker is attached to the log, and the signal is given to draw in the sky-line 1, which results in lifting sky-line, carrier block and log to an elevated position. The haul-back line 8 is then allowed to run free and the engine is started to operate drum 19, for pulling the block 5, and its load again to the position shown in full lines in Fig. 1 of the drawings.

It will thus be seen that the system is capable of great and quick adaptation to different and difficult areas to be logged.

As an important feature in such a logging system is the carrier block, my carrier block 5 has been especially designed and built by me for this work, and as the work is very heavy, said block is very large and heavy and is strengthened and at the same time adapted for many uses by the provision of the small sheaves mounted between its sides, as shown.

I am aware that changes can be made in my system as here shown for purposes of illustration, without departing from the spirit thereof, and I do not therefore, limit it, except as I may be limited by the hereto appended claims.

I claim:

1. In a logging system of the character referred to, in combination, a sky line, a haul back line, a carrier comprising a body having therein three sets of sheaves, upper, intermediate and lower, whereby to provide cable receiving ways therethrough, one way being between the upper and intermediate set of sheaves and the other way being between the intermediate and lower set of sheaves, said body being of tapering form with its small end provided with means for supporting a load, substantially as described.

2. In combination with two cable lines, a carrier therefor comprising a body having two sides, each of integral construction and of triangular form, a pair of upper sheaves therebetween in horizontal alinement with each other, a pair of intermediate sheaves therebetween, whereby to form a cable way through said body between said upper and intermediate sheaves, and a single sheave in said body between said intermediate sheaves and in slightly staggered relationship therewith whereby to form a confining cable way through said body between said intermediate and lower sheaves, and means at the lower small end of said body for supporting a load, substantially as shown and described.

Signed at Kent, King county, Washington, this 25th day of January, 1918.

OSCAR A. WIRKKALA.

In presence of—
 CHAS. R. OTEY,
 A. N. BERLIN.